O. W. HAHN.
GEAR SHIFTING LEVER LOCK.
APPLICATION FILED MAY 23, 1912.

1,061,938.

Patented May 13, 1913.

WITNESSES
A. H. Kephart
Frank Sinney

INVENTOR
OTTO W. HAHN
BY Carlos P. Griffin
HIS ATTORNEY

COLUMBIA PLANOGRAPH CO., WASHINGTON, D. C.

UNITED STATES PATENT OFFICE.

OTTO W. HAHN, OF SAN FRANCISCO, CALIFORNIA.

GEAR-SHIFTING-LEVER LOCK.

1,061,938.  Specification of Letters Patent.  Patented May 13, 1913.

Application filed May 23, 1912. Serial No. 699,185.

*To all whom it may concern:*

Be it known that I, OTTO W. HAHN, a citizen of the United States, residing at San Francisco, in the county of San Francisco and State of California, have invented a new and useful Gear-Shifting-Lever Lock, of which the following is a specification in such full and clear terms as will enable those skilled in the art to construct and use the same.

This invention relates to a locking device for the gear shift lever of an automobile and its object is to produce a strong lock which is easily operated and which can be applied to the gear lever with the minimum of labor.

It will be understood by those skilled in the art that the gear changes of an automobile are usually accomplished by means of a lever working through a slotted arm. This lock comprises a slidable bolt secured thereto which bolt can be locked in either one of two positions, in one of which it offers an obstruction to the movement of the gear shifting lever and prevents the car from being operated.

Figure 1:
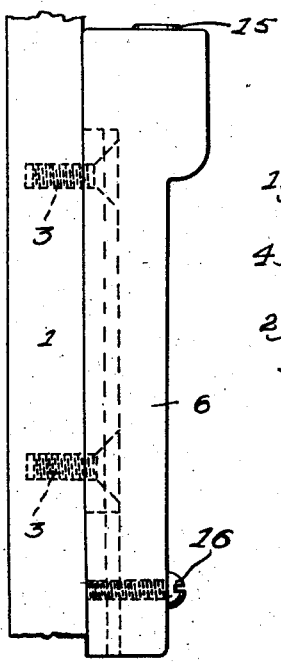
Figure 2:
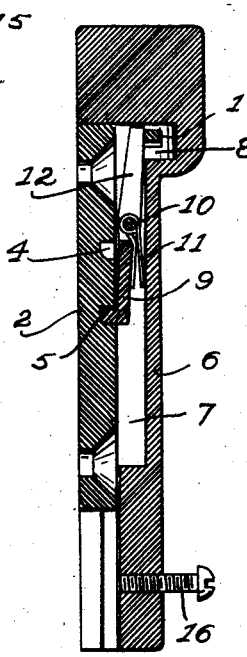
Figures 3, 4:
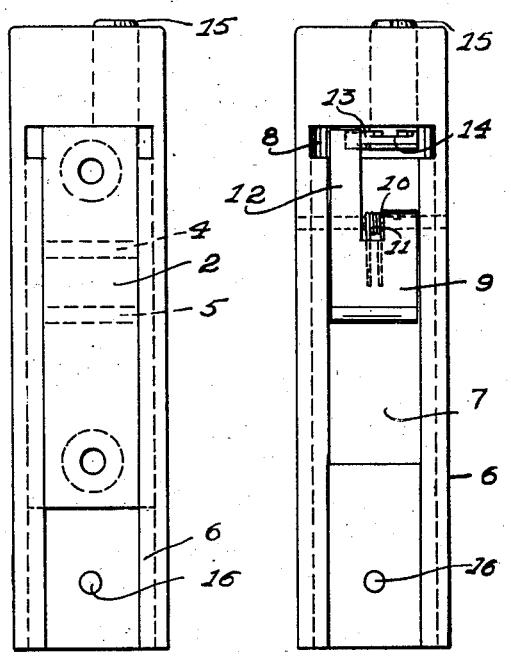
Figure 5:
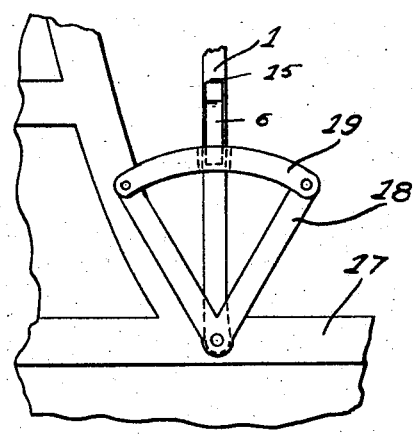
Figure 6:
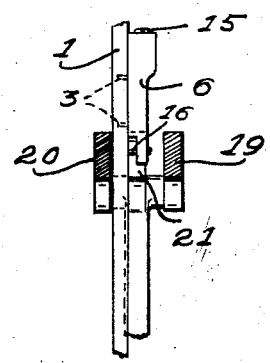

In the drawings in which the same numeral of reference is applied to the same portion throughout the several views, Figure 1 is a side elevation of a portion of the gear shifting lever having this lock applied thereto, Fig. 2 is a vertical sectional view of the lock and plate for securing the same to the lever, Fig. 3 is a view in elevation of the lock and plate for securing the same to the lever looking from the side to which it is fastened to the lever, Fig. 4 is a side elevation of the lock with the plate for securing the same to the gear shifting lever removed, Fig. 5 is a side elevation of a portion of the gear shifting lever and the slotted plate through which the lever moves to change the gears, and Fig. 6 is a sectional view of the slotted plate and a portion of the gear shifting lever showing the relation of the lock to the lever and slotted plate.

The numeral 1 represents the gear shifting lever and 2 represents a plate which is secured to the gear shifting lever by means of suitable screws 3. This plate has two notches 4 and 5 therein, which notches afford the means for holding the slidable bolt 6 in the desired adjustment. The slidable bolt 6 has a recess therein at 7 and a deeper recess at 8. In the recess 7 a lock 9 is pivoted on a pin 10, a spring 11 holding said lock normally in the position shown in Fig. 2. The upper end of the lock 9 has an arm 12, which arm contacts with the arm 13 on the bottom of the lock barrel 14. The lock barrel 14 has an escutcheon 15 through which the key is inserted in a well known manner for the rotation of the arm 13. When in use a screw 16 is run through the lower end of the slidable bolt 6 to prevent the bolt from being inadvertently lifted too high on the plate 2, (note Fig. 6).

An automobile body is shown at 17 and arms 18 are shown supporting the arc-shaped plates 19, 20 and 21, which form a path for the lever 1. It will be observed that the lever can move through the slot formed by the plates 20 and 21 and 19 and 21 only when no wider than those slots. However, when it is desired to lock the lever the bolt 6 is moved down into the position shown in Fig. 6 and thus effectually prevents the lever from being shifted out of the center position.

Having thus described my invention what I claim as new and desire to secure by Letters Patent of the United States, is as follows:

1. A lock for automobiles comprising in combination with a stationary quadrant and a lever movable relative thereto, of a plate having guides at the sides thereof secured on said lever, a bolt covering said plate and slidable thereover and covering its securing means, a locking member carried by said slidable bolt, and means to secure the bolt in the retracted or the extended position, substantially as described.

2. In a lock for automobiles, the combination with a change gear lever, of a plate having guides at the sides thereof, means to secure said plate to said lever, a slidable bolt carried by and slidable over said plate and covering its securing means, and a pivoted latch carried by the slidable bolt and adapted to coöperate with means upon the plate to hold the bolt either in the extended or the retracted position, substantially as described.

3. In a lock for automobiles, the combination with a change gear lever and a slotted quadrant through which said change gear lever passes, of a plate secured to said lever adjacent the slotted quadrant, a recessed bolt slidable on said plate and covering the same, a pivoted latch carried by said slidable bolt and operating within said recess for securing it in the extended or the retracted position, and key-operated mechanism for releasing the latch at will, substantially as described.

4. A lock for automobiles comprising in combination with change gear levers and a slotted quadrant through which said levers move, of a guide plate provided with detents secured to the lever adjacent the slots in said quadrant, means to secure said guide plate to the lever, a recessed slidable bolt carried by said plate and having longitudinal guides coöperating with the guide on said plate and covering the same, means to secure said plate to said lever, a locking member carried by the slidable bolt and operating within the recess and coöperating with said detents in said plate to hold the bolt in the retracted or extended position, and a mechanism located in the upper end of the bolt for releasing the locking member, substantially as described.

In testimony whereof I have hereunto set my hand this 1st day of May A. D. 1912, in the presence of the two subscribed witnesses.

OTTO W. HAHN.

Witnesses:
C. P. GRIFFIN,
HENRY B. LISTER.

Copies of this patent may be obtained for five cents each, by addressing the "Commissioner of Patents, Washington, D. C."